United States Patent
Ibezim et al.

(10) Patent No.: US 7,369,493 B2
(45) Date of Patent: May 6, 2008

(54) CONGESTION CONTROL IN AN IP NETWORK

(75) Inventors: James A. Ibezim, Wayside, NJ (US); Stephanie Parlamas, Colts Neck, NJ (US); Amy J. Rupert, Redbank, NJ (US); Harish Samarasinghe, Holmdel, NJ (US)

(73) Assignee: AT&T Corp., New York, NY (US)

( * ) Notice: Subject to any disclaimer, the term of this patent is extended or adjusted under 35 U.S.C. 154(b) by 856 days.

(21) Appl. No.: 10/754,043

(22) Filed: Jan. 8, 2004

(65) Prior Publication Data

US 2005/0088973 A1    Apr. 28, 2005

Related U.S. Application Data

(60) Provisional application No. 60/514,945, filed on Oct. 28, 2003.

(51) Int. Cl.
   - G01R 31/08 (2006.01)
   - G06F 11/06 (2006.01)
   - G08C 15/00 (2006.01)
   - H04J 1/16 (2006.01)
   - H04J 3/14 (2006.01)
   - H04L 1/00 (2006.01)
   - H04L 12/26 (2006.01)

(52) U.S. Cl. ...................................... 370/230
(58) Field of Classification Search ................ 370/231, 370/230, 235
   See application file for complete search history.

(56) References Cited

U.S. PATENT DOCUMENTS

| | | | |
|---|---|---|---|
| 5,253,248 A | 10/1993 | Dravida et al. | |
| 5,491,801 A | 2/1996 | Jain et al. | |
| 5,548,533 A | 8/1996 | Gao et al. | |
| 6,064,648 A * | 5/2000 | Hellman et al. | 370/230 |
| 6,064,892 A | 5/2000 | Miyagawa et al. | |
| 6,272,131 B1 * | 8/2001 | Ofek | 370/389 |
| 6,363,052 B1 | 3/2002 | Hosein | |

(Continued)

FOREIGN PATENT DOCUMENTS

WO    WO 03/015354    2/2003

OTHER PUBLICATIONS

Rosenberg, J et al., "SIP: Session Initiation Protocol", RFC 3261, The Internet Society, pp. 1-130, Jun. 2002.

(Continued)

*Primary Examiner*—Seema S. Rao
*Assistant Examiner*—Jianye Wu

(57) ABSTRACT

Upon detection of an overload condition at a network element, the network element sends two messages to those other network elements which may potentially send request messages to the overloaded network element. If the network utilizes the SIP signaling protocol, then the messages sent by an overloaded network element are SIP INVITE and SIP CANCEL. The CANCEL message comprises an indication that the sending network element is unavailable and an amount of time which the recipient network elements are to wait before sending any requests to the overloaded network node. Upon receipt of these messages, the receiving network elements wait for a delay time period before sending any additional request messages to the overloaded network element. During the waiting period, the waiting network elements may send request messages to network elements other than the overloaded network element which provide functionality similar to that of the overloaded network element.

7 Claims, 2 Drawing Sheets

U.S. PATENT DOCUMENTS

| | | |
|---|---|---|
| 6,389,034 B1 * | 5/2002 | Guo et al. ................. 370/441 |
| 6,469,991 B1 | 10/2002 | Chuah |
| 6,473,402 B1 | 10/2002 | Moharram |
| 6,591,301 B1 * | 7/2003 | Li et al. ..................... 709/229 |
| 2003/0152064 A1 * | 8/2003 | Khan et al. ................ 370/352 |
| 2003/0179762 A1 * | 9/2003 | Isomaki et al. ............ 370/401 |
| 2003/0210649 A1 * | 11/2003 | Bondi ........................ 370/229 |
| 2004/0086102 A1 * | 5/2004 | McMurry et al. ........... 379/219 |
| 2005/0088973 A1 * | 4/2005 | Ibezim et al. .............. 370/235 |
| 2005/0132000 A1 * | 6/2005 | Richardson et al. ........ 709/204 |
| 2006/0193259 A1 * | 8/2006 | Cembellin et al. .......... 370/235 |

OTHER PUBLICATIONS

Sparks, R., "SIP Load Management", Internet-Draft, The Internet Society, pp. 1-9, Oct. 17, 2003.

Microsoft Corporation, "Creating a Boot Disk for an NTFS or FAT Partition", pp. 1-4, Feb. 4, 1999, Internet Citation Downloaded on May 24, 2006.

European Patent Office Search Report for Corresponding European Patent Application No. 04105238.2-2414.

* cited by examiner

CONGESTION CONTROL IN AN IP NETWORK

This application claims the benefit of U.S. Provisional Application No. 60/514,945, filed Oct. 28, 2003.

BACKGROUND OF THE INVENTION

The conventional Public Switched Telephone Network (PSTN) is a circuit switched network in which calls are assigned dedicated circuits during the duration of the call. Such networks are well known in the art, and service providers have developed various services which may be provided to subscribers via such a conventional circuit switched network.

Recently, data packet networks, such as local area networks (LAN) and wide area networks (WAN) have become more prevalent. These data packet networks operate in accordance with the internet protocol (IP) and such networks are referred to as IP networks. The popularity of IP networks has created an interest in providing voice and related services over IP networks.

Conventional PSTN voice services dedicate a circuit connection between a calling and called party, and as such, that connection is guaranteed a certain level of performance because it is not shared with any other network users. IP networks, on the other hand, are shared networks in which the network resources are shared between users. The notion of a connection in a data packet network is very different from the notion of a connection in a circuit network. In a circuit network, the connection is a dedicated circuit which is used only by the calling and called parties. As such, it is easy to guarantee a certain level of service via the circuit network. The problem with such a network is that of efficiency. That is, the dedication of a circuit between all calling and called parties may be inefficient because such dedicated circuits provide more bandwidth than is necessary. In a data network, the connection between two parties is not dedicated, and traffic between the parties is transmitted via the data packet network along with the data packets of other users. There is no dedicated path between the parties, and data packets may be transmitted between the parties via different paths, depending upon network traffic.

One of the difficulties with providing voice and other services over an IP network is that certain services require a minimum guaranteed level of service. For example, in order for a voice over IP (VoIP) call to provide an acceptable level of service, the connection must provide a certain bandwidth so that voice quality is acceptable. Other related services (e.g., data, video) also require a minimum guaranteed level of service in order to be acceptable. As IP network traffic increases, the network may become congested, and as such, the services provided via the network may become degraded.

Network congestion may be the result of the network elements becoming overloaded. For example, if the load on a network element becomes greater than its processing capability, then an overload condition may be reached at the network element. Such an overload condition could result in degraded performance and network services provided in connection with the network element may be adversely impacted. A serious problem occurs when the service provided by the network falls below a required minimum guaranteed level of service.

What is needed is a technique for controlling network congestion resulting from an overload condition at network elements.

BRIEF SUMMARY OF THE INVENTION

The present invention provides a method for congestion control in an IP network. In accordance with an embodiment of the invention, when a network element detects an overload condition, the network element informs its so-called counterpart network elements of the overload condition. The counterpart network elements of a particular network element are those network elements which potentially send request messages to the particular network element. The overloaded network element informs its counterpart network elements of the overload condition as follows. The overloaded network element sends to its counterparts a first message followed by a second message containing an indication that the sending network element is overloaded. Advantageously, the second message is sent within a threshold time interval after the first message. In accordance with a particular embodiment of the invention which is implemented in an IP network which utilizes the Session Initiated Protocol (SIP) for call setup signaling, the first message is a SIP INVITE message and the second message is a SIP CANCEL message. The receipt by a counterpart network element of the two messages as described above indicates to the recipient network element that the network element sending the messages is in an overload condition.

In accordance with one particular embodiment, one of the messages may indicate a delay time period during which the recipient network element will wait before sending any requests to the overloaded network element. In the above SIP embodiment of the invention, the delay time period is specified in the SIP CANCEL message. Further, in the SIP embodiment, the SIP CANCEL message also contains a reason code which indicates that the sender is in an overload condition.

The use of the method of the present invention provides an improved method of congestion control in an IP network. Notifying the counterpart network elements that a particular network element is overloaded (i.e., has reached some processing threshold) allows the counterpart network elements to begin sending request messages to other network elements (if available) which provide the same functionality as the overloaded network element. This helps prevent the overloaded network element from causing a degradation in service to users of the IP network.

These and other advantages of the invention will be apparent to those of ordinary skill in the art by reference to the following detailed description and the accompanying drawings.

DETAILED DESCRIPTION

Figure 1:
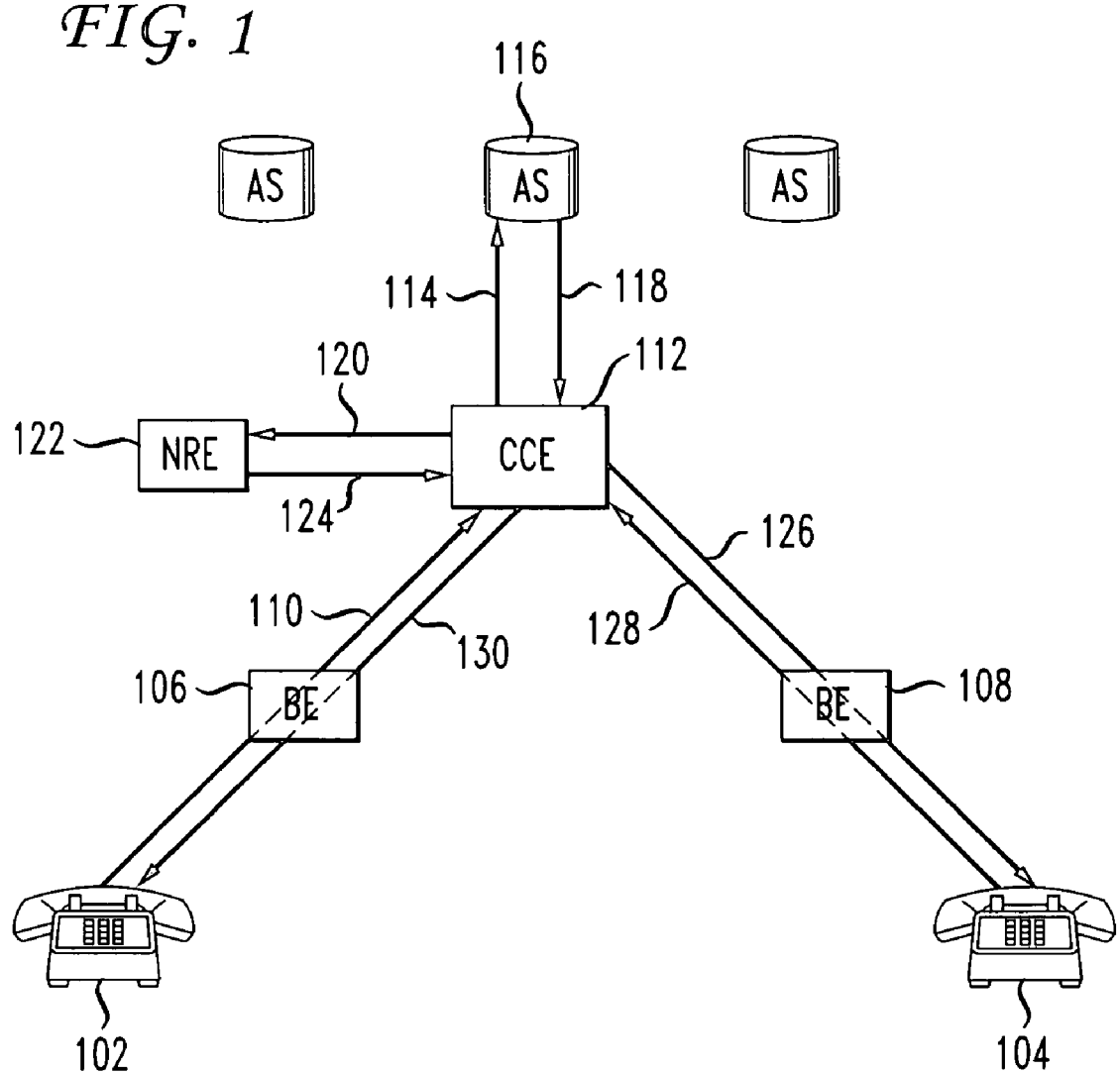
FIG. 1 shows an IP network in which one embodiment of the present invention may be implemented.

FIG. 1 shows an IP network in which one embodiment of the present invention may be implemented. The network utilizes the Session Initiation Protocol (SIP) in order to set up connections (e.g., VoIP calls) between users. SIP is a well known application-layer control protocol used to establish, modify and terminate sessions such as IP telephony calls. SIP is described in detail in Internet Engineering Task Force (IETF) Request for Comments (RFC) 3261; SIP: Session Initiation Protocol; J. Rosenberg, H. Schulzrinne, G. Camarillo, A. Johnston, J. Peterson, R. Sparks, M. Handley, E. Schooler; June 2002, which is incorporated by reference herein. The details of SIP will not be described herein, as the protocol is well known to those skilled in the art. The protocol will be described only insofar as necessary for an understanding of the present invention.

With reference to FIG. 1, it is to be understood that the network elements shown in FIG. 1 are logical entities. Such logical entities may be implemented in various hardware configurations. For example, these network elements may be implemented using programmable computers which are well known in the art. Such programmable computers would have the required network interfaces to allow for network communication, as well as appropriate software for defining the functioning of the network elements. Such software is executed on one or more computer processors which control the overall operation of the network elements via execution of such software. The detailed hardware and software configuration of the network elements will not be described in detail herein. One skilled in the art of data networking and computers could readily implement such network elements given the description herein. As used herein, a network element refers to a logical entity which performs a network function. A network node refers to the computing platform on which a network element is implemented.

Referring now to FIG. 1, the basics of call set-up will be described. Assume that IP enabled telephone 102 wishes to initiate an IP telephony call to IP enabled telephone 104. In FIG. 1, telephone 102 is connected to a border element (BE) 106 which provides telephone 102 access to the IP network. Similarly, telephone 104 is connected to BE 108 which provides telephone 104 access to the IP network. In the example of FIG. 1, the transaction begins by telephone 102 sending an INVITE request 110 addressed to telephone 104's Uniform Resource Identifier (URI) which identifies telephone 104. The INVITE request contains a number of header fields which are named attributes that provide additional information about a message. The details of an INVITE are well known and will not be described in detail at this point.

The INVITE message 110 is received at the call control element (CCE) 112. The CCE 112 performs the functions of interfacing with other network elements such as Border Elements, Service Brokers (SB), Application Servers (AS), Media Servers (MS), Network Routing Engines (NRE), and others, to provide the necessary functions to process a call request. The CCE 112 determines whether special feature processing is required by the call based on the information it receives in the incoming call request (for example the dialed number in the incoming call request). One example of special processing is 8YY (e.g., 800) service processing. If special feature processing is required, the CCE 112 sends a query (an SIP INVITE) 114 to the appropriate application server (AS), for example AS 116. The AS 116 performs the required feature processing and returns by message 118 an appropriate routing number for the call. Upon receipt of the routing number, the CCE 112 sends a request message (SIP INVITE) 120 to the network routing engine (NRE) 122 to determine the IP address of the appropriate BE for further routing. The NRE 122 returns the requested information by message 124. It is noted that the NRE 122 is shown as a separate logical network element in the network of FIG. 1.

In various embodiments, the NRE function may be implemented on the same network node as the CCE 112 or on a separate network node.

Upon receipt of the address of the appropriate BE (in this case BE 108), CCE 112 forwards the INVITE message 126 to telephone 104 via BE 108. The telephone 104 accepts the call by sending an OK message 128 back to the CCE 112. The CCE 112 forwards the OK message 130 to telephone 102 via BE 106. The VoIP call between telephone 102 and telephone 104 is now set up.

The above description is a high level overview of call processing in an IP network using SIP. While all the details of call processing in accordance with SIP are not necessary for an understanding of the present invention, the above description illustrates that there are many messages which are required in order to set up one basic call between two endpoints. Of course, in an actual network implementation, there would be additional network elements as well as many calls being set up simultaneously. Further, as IP networks become more popular, the number of calls being handled by each of the networks will increase, which results in an increase in the SIP signaling traffic which must be handled by the network.

As the signaling traffic increases, the load upon the network elements increases. More specifically, the load upon the network nodes implementing the network elements increases as the signaling traffic increases. For example, referring again to the network of FIG. 1, as the signaling traffic increases, an increased load will be placed upon the CCE. If the processing hardware of the network node upon which the CCE is implemented becomes overloaded, the services provided by the FIG. 1 network will degrade, and may fall below a required minimum level.

The SIP protocol, as currently defined by RFC 3261, does not contain a technique for specifically dealing with network congestion. As such, as traffic in an IP network increases, the SIP signaling will continue to increase and will eventually result in a degradation of services provided by the IP network.

The present invention provides a technique for controlling congestion in an IP network. The technique, while not limited to the SIP protocol, may advantageously be implemented within a network utilizing the SIP signaling protocol for call setup.

Figure 2:
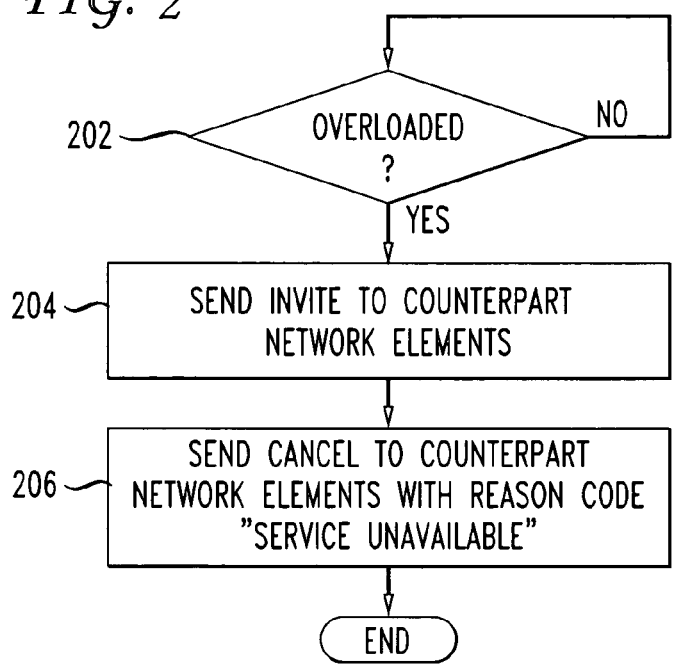
FIG. 2. shows a flowchart illustrating the steps performed by a network element in accordance with one embodiment of the present invention.

FIG. 2 shows a flowchart illustrating the steps performed by a network element in accordance with one embodiment of the present invention. First, in step 202, the network element determines whether an overload condition exists on the network node implementing the network element. There are various ways to accomplish this step. In one embodiment, the network node monitors the processing capacity of its one or more central processing units, and determines that an overload condition exists when the processing capacity reaches some processing capacity threshold. The threshold will be different depending upon the particular implementation of the network node. The network node may determine an overload condition based on the performance criteria of other hardware in addition to its central processing unit. For example, the network node may monitor the traffic being received by its network interfaces or may monitor the amount of data in its buffer or queue. For clarity of description, a network element executing on a network node in an overload condition may be referred to as an overloaded network element (or a network element having an overload condition). It is to be understood that as used in this description and in the claims, reference to an overloaded network element or network node means that the network element or node has reached some threshold measurement of its processing capabilities, and does not necessarily mean that the network element or node is overloaded to the point of a degradation of service or even that the processing capacity of the element or node has reached a maximum. In fact, in an implementation of the present invention, it is advantageous to define an overload condition such that the condition will be reached prior to any actual degradation of network service. Thus, the term overload is used to indicate that the network element or node has reached some defined threshold of processing capability such that congestion control processing, as described herein, is initiated.

As represented by decision block 202, the network node will continuously monitor itself for an overload condition. Upon detection of an overload condition, the network element executing on the overloaded network node sends an INVITE message to its counterpart network elements. As used herein, the counterparts of a particular network element are those network elements which potentially send requests to the particular network element. Thus, in step 204, the network element executing on the overloaded network node sends an INVITE message to its counterpart network elements. An appropriate INVITE message sent from an overloaded network element to a counterpart network element is as follows (the line numbers are not part of the SIP message, but are added here for ease of reference):

1. INVITE sip: nwkngbe@nwkngbe.att.com SIP/2.0
2. Via: SIP/2.0/UDP fhas1.att.com:5060
3. Max-Forwards: 5
4. From: <sip:mtcce@mtcce.att.com>
5. To: <sip: nwkngbe@nwkngbe.att.com>
6. Call-ID: c394563-2010c 2e32238@fhas1.att.com
7. CSeq: 100 INVITE
8. Contact: sip: mtcce@mtcce.att.com:5060
9. Content-Length: 0

Line 1 identifies this message as an INVITE message and identifies the recipient of the message. In this case, the recipient is identified as nwkngbe@nwkngbe.att.com. Line 2 is the Via field which contains the transport protocol used to send the message, the sender's host name or network address, and the port number at which it wishes to receive responses. Line 3 contains the Max-Forwards field and indicates the number of times this message is allowed to be forwarded. Line 4 contains the From field and indicates the initiator of the request, in this case the network element in the overload condition. Line 5 contains the To field and indicates the recipient of the request, in this case a counterpart of the network element in the overload condition. Line 6 contains the Call-ID field which uniquely identifies the invitation. Line 7 contains the CSeq field and contains a single decimal sequence number and the request method. The CSeq header field serves to order transactions within a dialog, to provide a means to uniquely identify transactions, and to differentiate between new requests and request retransmissions. Line 8 is the Contact field and specifies the IP address and the port number combination of the originator of the INVITE. Line 9 is the Content-Length field and specifies the size of the message. In the present case, the Content-Length is 0 because there is no Content-Type (i.e., no payload) in the call request.

Thus, in step 204, the overloaded network element sends an INVITE message to each of its counterpart network elements (or to each of its counterparts which are to be notified of the overload condition). In step 206 the network node sends CANCEL messages to the same counterpart network elements to which it sent INVITE messages in step 204. Advantageously, the CANCEL messages are sent to the counterpart network elements within a threshold time interval after sending the INVITE messages. The choice of the threshold time interval is implementation dependent. An exemplary threshold interval which may be used is 1-4 milliseconds.

An appropriate CANCEL message sent from an overloaded network element to a counterpart network element is as follows (the line numbers are not part of the SIP message, but are added here for ease of reference):

1. CANCEL sip: nwkngbe@nwkngbe.att.com SIP/2.0
2. Via: SIP/2.0/UDP fhas1.att.com:5060
3. From: <sip: mtcee@mtcee.att.com>
4. To: <sip: nwkngbe@mtcce.att.com>
5. Call-ID: c394563-211c 2e32238@fhas1.att.com
6. CSeq: 101 CANCEL
7. Reason: sip: cause=503; text="Service Unavailable"
8. Retry-After: 5
9. Content-Length: 0

Line 1 identifies this message as a CANCEL message and identifies the recipient of the message. In this case, the recipient is identified as nwkngbe@nwkngbe.att.com. Line 2 is the Via field as described above. Line 3 contains the From field and indicates the initiator of the request, in this case the network element in the overload condition. Line 4 contains the To field and indicates the recipient of the request, in this case the counterpart of the network element in the overload condition. Line 5 contains the Call-ID field which uniquely identifies the message. Line 6 contains the CSeq field as described above. Line 7 contains the Reason field, and in accordance with an embodiment of the invention, the cause is set to 503 and the text is set to "Service Unavailable". This indicates to the receiving counterpart network element that the reason for the CANCEL is that the sending network element is experiencing an overload condition. Line 8, in accordance with this embodiment of the invention, contains the Retry-After field and specifies the length of time that the counterpart network element is to wait prior to sending any additional requests the sending network element. In this case, the Retry-After field contains a 5 as an exemplary threshold, which indicates that the counterpart network element receiving this CANCEL message is to wait 5 seconds prior to sending any additional requests to the sending network element. Line 9 is the Content-Length field and specifies the size of the message. In the present case, the Content-Length is 0 because there is no Content-Type (i.e., no payload) in the CANCEL message.

Figure 3:
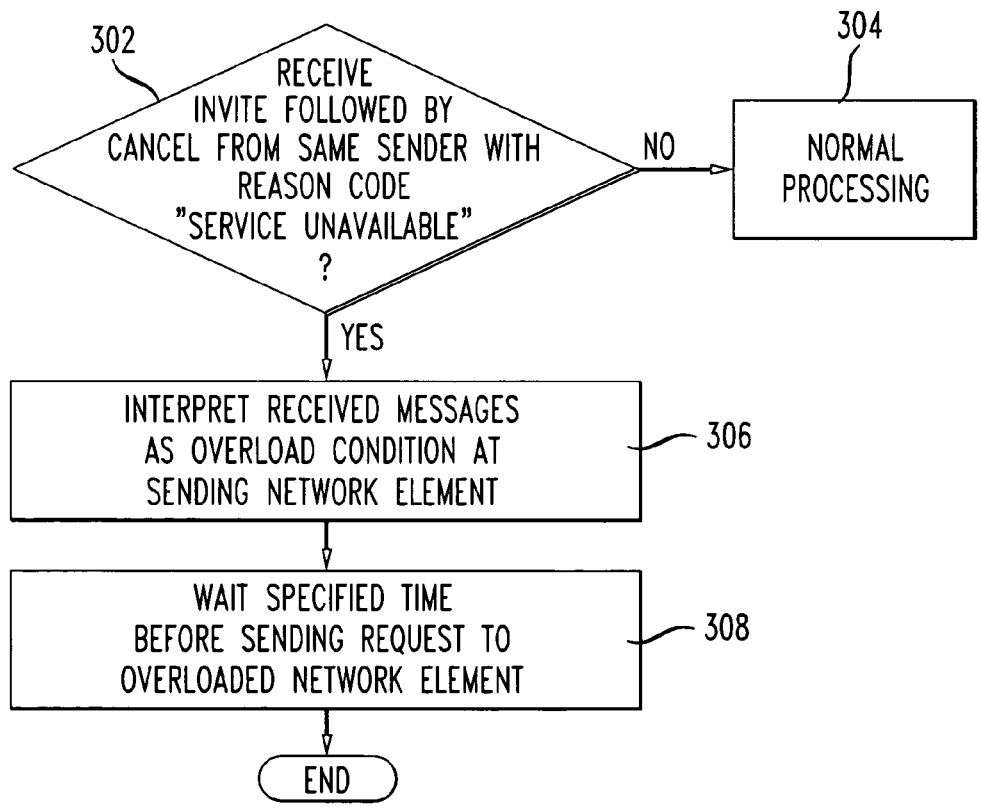
FIG. 3 shows a flowchart illustrating the steps performed by a network element upon receipt of messages in accordance with an embodiment of the invention.

FIG. 3 is a flowchart showing the processing steps of a network element upon receipt of an INVITE and CANCEL message as described above. First, in step 302 a receiving network element determines whether it has received an INVITE message followed by a CANCEL message from the same sending network element and where the CANCEL message has a Reason field containing cause=503; text="Service Unavailable". Of course, other embodiments may use other data in the Reason field to flag an overload condition. It is noted here that the CANCEL message will generally be received by the receiving network element relatively soon after receiving the INVITE because the sending network element sends the two message within a threshold time interval. If the receiving network element does not receive an INVITE message followed by a CANCEL message containing the above described data in the Reason field, then the network element continues normal processing as represented by block 304.

If the receiving network element does receive an INVITE message followed by a CANCEL message containing the above described data in the Reason field, then as represented by block 306, the receiving network element interprets these messages as an indication that the sending network element (as identified in the From field of the messages) is in an overload condition. As represented by block 308, the receiving network element will wait before sending any additional requests to the overloaded network element. In one embodiment, the amount of time that the receiving network element will wait is specified in the Retry-After field (line 8 in the example given above) of the CANCEL message.

Thus, as described above, the receipt of both an INVITE message and a CANCEL message from the same sending network element containing specific data in the Reason field indicates to the receiving network element that the sending network element is in an overload condition, and the recipient network element will wait for a period of time prior to sending any requests to the overloaded network element. During the waiting period, the recipient network element may send requests to alternate network element which provide the same services as the overloaded network element, if any such network elements are available. This prevents any delay in setting up a call due to sending a setup request to an overloaded network element.

If there is more than one network element executing on an overloaded network node, then each of these network elements may be considered to be overloaded and each such overloaded network element would execute the steps shown in FIGS. 2 and 3 as described above.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for congestion control in an IP network operating in accordance with the Session Initiated Protocol (SIP) comprising the steps of:
   in response to determining an overload condition at a first network element:
      sending a SIP INVITE message from said first network element to at least one other network element at a first time; and
      sending a SIP CANCEL message from said first network element to said at least one other network element at a second time, said SIP CANCEL message comprising an indication that said first network element is unavailable;
   wherein the time interval between said first time and said second time is less than a threshold time interval between 1-4 milliseconds.

2. The method of claim 1 wherein said SIP CANCEL message specifies a delay time period during which request messages are not to be sent to said first network element.

3. The method of claim 1 wherein said at least one other network element comprises a plurality of network elements which potentially send request messages to said first network element.

4. A method for congestion control in an IP network operating in accordance with the Session Initiated Protocol (SIP) comprising the steps of:
   receiving at a first network element at a first time a SIP INVITE message sent from a second network element;
   receiving at said first network element at a second time a SIP CANCEL message sent from said second network element;
   wherein the time interval between said first time and said second time is less than a threshold time interval between 1-4 milliseconds; and
   if said SIP CANCEL message comprises an indication that said second network element is unavailable then waiting a delay time period before sending request messages from said first network element to said second network element, wherein said delay time period is specified in said SIP CANCEL message.

5. The method of claim 4 further comprising the step of:
   during said delay time period, said first network element sending request messages to alternate network elements which provide the same service as the second network element.

6. A method for congestion control in an IP network operating in accordance with the Session Initiated Protocol (SIP) comprising the steps of:
   in response to determining an overload condition at a first network element, sending a SIP INVITE message and a SIP CANCEL message from said first network element to at least one counterpart network element, wherein said SIP CANCEL message comprises an indication that said first network element is unavailable;
   receiving at said at least one counterpart network element said SIP INVITE and SIP CANCEL messages;
   wherein the time interval between sending said SIP INVITE message and said SIP CANCEL message is less than a threshold time interval between 1-4 milliseconds; and
   in response to receipt of said SIP INVITE and SIP CANCEL messages, determining that said first network element is in an overload condition and waiting a delay time period before sending request messages from said at least one counterpart network element to said first network element, wherein said delay time period is specified in said SIP CANCEL message.

7. The method of claim 6 further comprising the step of:
   during said delay time period, said at least one counterpart network element sending request messages to alternate network elements which provide the same service as the first network element.

* * * * *